United States Patent
Anderson

(10) Patent No.: US 11,479,448 B2
(45) Date of Patent: Oct. 25, 2022

(54) CONNECTABLE PULLEY BLOCK

(71) Applicant: Anderson Rescue Solutions, LLC, Glenside, PA (US)

(72) Inventor: Timothy E. Anderson, Glenside, PA (US)

(73) Assignee: Anderson Rescue Solutions, LLC, Glenside, PA (US)

( * ) Notice: Subject to any disclaimer, the term of this patent is extended or adjusted under 35 U.S.C. 154(b) by 0 days.

(21) Appl. No.: 17/345,364

(22) Filed: Jun. 11, 2021

(65) Prior Publication Data

US 2021/0300737 A1 Sep. 30, 2021

Related U.S. Application Data

(63) Continuation of application No. 16/462,350, filed as application No. PCT/US2017/064221 on Dec. 1, 2017, now Pat. No. 11,034,560.

(60) Provisional application No. 62/429,553, filed on Dec. 2, 2016.

(51) Int. Cl.
  *B66D 3/00* (2006.01)
  *B66D 3/04* (2006.01)
  *F16H 55/36* (2006.01)

(52) U.S. Cl.
  CPC .............. *B66D 3/046* (2013.01); *F16H 55/36* (2013.01)

(58) Field of Classification Search
  CPC .......... B66D 3/046; B66D 3/06; B66D 3/043; B66D 3/26; B66D 2700/028; F16H 55/36
  See application file for complete search history.

(56) References Cited

U.S. PATENT DOCUMENTS

| 188,759 | A | | 3/1877 | Simpson et al. |
| 499,536 | A | | 6/1893 | Gilmore |
| 1,376,457 | A | * | 5/1921 | Nesmeyer ............... B66D 3/06 254/404 |
| 1,379,868 | A | | 5/1921 | Kelsey |
| 1,435,953 | A | * | 11/1922 | Boykin, Jr. ............. B66D 3/06 254/401 |
| 1,633,537 | A | | 6/1927 | McKissick |
| 1,650,903 | A | | 11/1927 | McKissick |
| RE17,211 | E | | 2/1929 | McKissick |
| 2,082,169 | A | | 6/1937 | McKissick |
| 2,180,541 | A | | 11/1939 | Talmage |
| 2,423,142 | A | | 4/1944 | Frankhouser |
| 2,960,310 | A | | 4/1959 | Hull |

(Continued)

FOREIGN PATENT DOCUMENTS

| CN | 204015905 | 12/2014 |
| CN | 105197772 | 12/2015 |

(Continued)

OTHER PUBLICATIONS

International Search Report and Written Opinion dated Feb. 15, 2018 for International Patent Application No. PCT/US2017/064221.

*Primary Examiner* — Emmanuel M Marcelo
(74) *Attorney, Agent, or Firm* — Morgan, Lewis & Bockius LLP

(57) ABSTRACT

A pulley block may include an alpha pulley block including an alpha connector, a beta pulley block including a beta connector, wherein the alpha pulley block is coupled to the beta pulley block when the alpha connector is coupled to the beta connector. At least one of the alpha connector and the beta connector may comprise magnets.

29 Claims, 12 Drawing Sheets

(56) References Cited

U.S. PATENT DOCUMENTS

| | | |
|---|---|---|
| 3,827,514 A | 8/1974 | Bradley |
| 4,240,614 A | 12/1980 | Comer, Jr. |
| 4,676,484 A | 6/1987 | Reed |
| 4,721,286 A | 1/1988 | Hey et al. |
| 5,154,401 A | 10/1992 | Schramm |
| 7,168,687 B2 | 1/2007 | Thompson |
| 2002/0100900 A1 | 8/2002 | Graham |
| 2003/0111655 A1 | 6/2003 | Habberstad |
| 2004/0084917 A1 | 5/2004 | Zollondz et al. |
| 2004/0183061 A1 | 9/2004 | Winter et al. |
| 2010/0237641 A1 * | 9/2010 | Drent ............ B66C 1/34 294/82.11 |

FOREIGN PATENT DOCUMENTS

| | | | |
|---|---|---|---|
| CN | 105347220 A | * | 2/2016 |
| CN | 106185676 B | * | 8/2018 |
| WO | WO-2016202792 A1 | * | 12/2016 ........... B66D 3/06 |

* cited by examiner

CONNECTABLE PULLEY BLOCK

CROSS-REFERENCE TO RELATED APPLICATIONS

This application is a Continuation of U.S. patent application Ser. No. 16/462,350 filed May 20, 2019, which is a U.S. National Stage of International Patent Application No. PCT/US2017/064221, filed on Dec. 1, 2017, which claims the benefit of U.S. Provisional Patent Application No. 62/429,553 filed Dec. 2, 2016 entitled "Magnetically Connectable Pulley Block", each of which is incorporated by reference herein in its entirety.

BACKGROUND OF THE INVENTION

The present invention relates to an improved pulley block having a first plate that enables the block to magnetically connect to a matching block of the same kind. This design and method facilitates the combination of two single sheave blocks to become a double sheave block.

A pulley block can receive a connecting element such as rope or cable, and generally consists of a pulley or a series of pulleys set between side plates. The side plates conventionally contain an eyelet or hook through which the block is attached to an anchor or integrated into a system. A pulley is a simple machine made of a grooved wheel on which a rope or cable may be run to change the direction of the force applied along the rope or cable to move a load. The grooved wheel is commonly referred to as a sheave, and may rotate on a bearing about an axle. Pulleys may contain a single sheave or several sheaves in series within the same block.

Pulleys have a wide field of application, employed in almost any field that utilizes rope or cable. These fields include recreational activities such as climbing, sailing, spelunking, and caving, as well as occupational fields such as construction, rescue in varying environments, tree care, industrial lifting and moving, and military applications. The aforementioned applications will be referred to as "rigging."

FIG. 1 illustrates a conventional single sheave pulley 100 which includes a first side plate 2 and a second side plate 4 connected by an axle 6 that runs through the single sheave 8 positioned between the side plates. When the side plates align, the eyelets in each side plate (not shown) facilitate the insertion of a carabiner as an attachment point to the rigging. The carabiner prevents the side plates from rotating in respect to one another, holding the pulley assembly together and keeping a bight of rope (not shown) in place within the pulley assembly. A single sheave pulley can only accommodate a single bight of rope at one time.

FIG. 2 illustrates a conventional double sheave pulley 200 including a first side plate 22 that pivots about an axle 28 which passes through a mid plate 24 and through a second pivoting side plate 26. Held within the pulley assembly are two sheaves 30, 32 that rotate around the axle 28 on opposite sides of the mid plate 24. A double sheave pulley can accommodate two bights of rope within the same pulley assembly, one bight of rope per sheave.

While it is possible to combine two single sheave pulleys 100 on a single carabiner or other connector to give the functional equivalent of a double sheave pulley 200, this configuration is clumsy, inefficient, and difficult to manage, possibly resulting in twists of the rope that can cripple a pulley system. Similarly, it is possible to use only one sheave of a double sheave pulley 200 to accomplish what would normally be tasked to a single sheave pulley 100, but the force of a moving rope through only one side of a double sheave pulley 200 can create imbalanced loading of the pulley assembly, resulting in increased friction. In addition, using a double sheave pulley 200 where the pulley system only requires a single sheave pulley 100 translates into additional equipment weight that must be carried by rescue personnel, a detriment to the efficiency of the rescue team.

In view of the foregoing, it is desirable to have an improved pulley system

BRIEF SUMMARY OF THE INVENTION

In one embodiment, a pulley block includes an alpha pulley block including alpha connector and a beta pulley block including beta connector, wherein the alpha pulley block is coupled to the beta pulley block when the alpha connector are coupled to the beta connector. In a further embodiment, the alpha pulley block may comprise a first plate, a second plate, and a sheave between the first plate and the second plate. The sheave may be rotatable about an axis transverse to each of the first plate and the second plate. The alpha connector may be coupled to the first plate. The second plate may be rotatable relative to the first plate to move the pulley block from a closed configuration to an open configuration. The pulley block may be configured to receive a bight of rope when the pulley block is in the open configuration. The beta pulley block may be substantially similar to the alpha pulley block. The sheave of the alpha pulley block and the sheave of the beta pulley block may be coaxial. The alpha pulley block and the beta pulley block may each include an eyelet configured to receive a connector. In a further embodiment, the pulley block may include a carabiner coupled to the eyelet of each of the beta pulley block and the alpha pulley block, thereby coupling the alpha pulley block to the beta pulley block. The eyelet may include a beveled edge. The sheave may be defined by a sheave axis, the first plate may engage the second plate along a plate axis, and the sheave axis may be offset from the plate axis. The alpha pulley block and the beta pulley block may be two of a plurality of pulley blocks forming a pulley block kit. Each of the plurality of pulley blocks may be coupleable to each of the other of the plurality of pulley blocks in the pulley block kit. Each of the alpha pulley block and the beta pulley block may be configured for use as a single pulley block.

In one embodiment, a method of coupling a plurality of sheave blocks together may include obtaining an alpha pulley block including alpha connector, obtaining a beta pulley block including beta connector, and bringing the alpha pulley block into proximity with the beta pulley block such that the alpha connector engage the beta connector, thereby coupling the alpha pulley block to the beta pulley block. The alpha connector and the beta connector may align the alpha pulley block with the beta pulley block. The alpha pulley block may comprise a first plate, a second plate, and a sheave between the first plate and the second plate. The sheave may be rotatable about an axis transverse to each of the first plate and the second plate. The alpha pulley block and the beta pulley block may be substantially similar. The sheave of the alpha pulley block and a sheave of the beta pulley block may be co-axial when the alpha pulley block is coupled to the beta pulley block. In a further embodiment, the method may include rotating the second plate relative to the first plate to move the pulley block from a closed configuration to an open configuration. In a further embodiment, the method may include coupling a rope to the pulley block when the pulley block is in the open configuration, and rotating the second plate relative to the first plate to move the pulley block from the open configuration to the closed configuration. Each of the alpha pulley block and the beta pulley block may include an eyelet and the method may further comprise coupling a carabiner to the eyelet of each of the alpha pulley block and the beta pulley block to couple the alpha pulley block to the beta pulley block. Coupling the carabiner to the pulley blocks may secure the pulley block in the closed configuration. The alpha pulley block and the beta pulley block may be two of a plurality of pulley blocks included in a pulley block kit, wherein any one of the plurality of pulley blocks are coupleable to any of another of the plurality of pulley blocks. In a further embodiment, the method may include coupling a rope to the sheave of each of the alpha pulley block and the beta pulley block. In a further embodiment, the method may include coupling the carabiner to a support structure. In a further embodiment, the method may include coupling the rope to rigging. In a further embodiment, the method may include coupling one of the alpha pulley block and the beta pulley block to a connector, coupling the connector to rigging, coupling a rope to the one of the alpha pulley block and the beta pulley block, and using the rope to lift an object.

BRIEF DESCRIPTION OF THE SEVERAL VIEWS OF THE DRAWINGS

The foregoing summary, as well as the following detailed description of embodiments of the pulley block, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE INVENTION

The present invention includes pulley blocks and pulley block assemblies. In some embodiments, the pulley block may be moved to an open configuration to receive a bite of rope or cable. In one embodiment, the pulley block comprises a first plate, a second plate, an axle, and a sheave. In some embodiments, the second plate may pivot about an axis defined by the axle to an open configuration wherein a bight of rope or cable may be placed between the first plate and the second plate. The second plate may be counter rotated to return the pulley block to a closed configuration. The axle may be coupled to one or more of the first plate and the second plate. The sheave may be mounted between the second plate and first plate to rotate about the axle. In one embodiment, the sheave includes a groove configured to receive the bight of rope or cable loaded in the pulley block. At least one of the first plate and the second plate of the pulley block may contain an eyelet through which a carabiner or other snap-link can pass to rotationally fix the first plate relative to the second plate, thus securing the pulley block in the closed configuration. A connector may be configured to allow the first plate of one exemplary pulley block assembly to connect to the first plate of a second exemplary pulley block assembly, in effect turning a single sheave pulley block into a double sheave pulley block. This may enable the insertion of two bights of rope or cable in the combined pulley blocks. A carabiner or other snap-link may then be passed through the eyelets in both second plates and both first plates, effectively locking the two pulley blocks together with two bights of rope or cable within the assembly.

The connector may comprise, for example, one or more tongue and groove connectors, expandable anchors and recesses, ball and detents, hook and loop fasteners, snap fits, or nuts and bolts embedded into or coupled to the first plate of the exemplary pulley block to match the alignment of a similar pulley block. In one embodiment, the connector comprises at least one magnet coupled to the first plate of the exemplary pulley block to match the alignment of a similar pulley block but with an opposite magnetic pole exposed such that the magnets of each block are attracted to one another.

Figure 1:
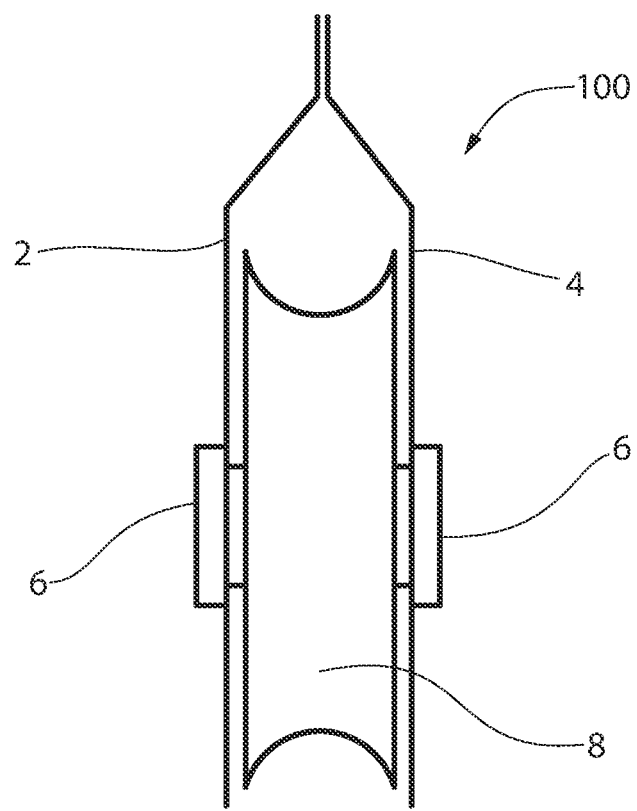
FIG. 1 illustrates a side view of a prior art single sheave pulley block.
Figure 2:
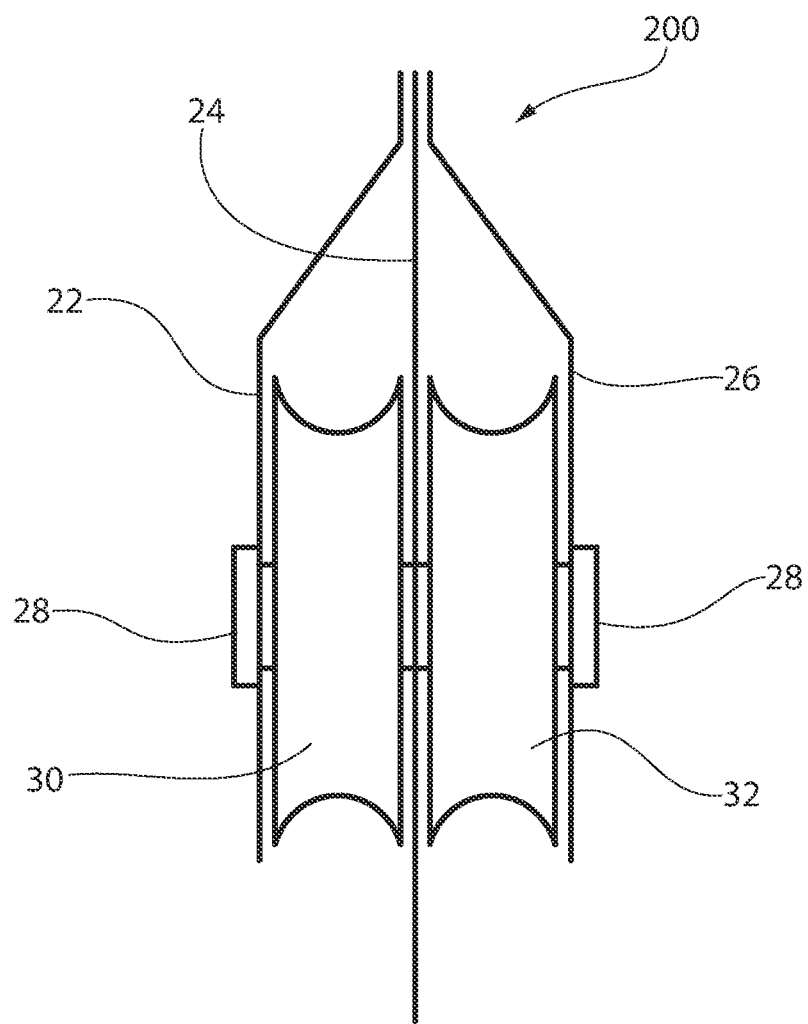
FIG. 2 illustrates a side view of a prior art double sheave pulley block.
Figure 3:
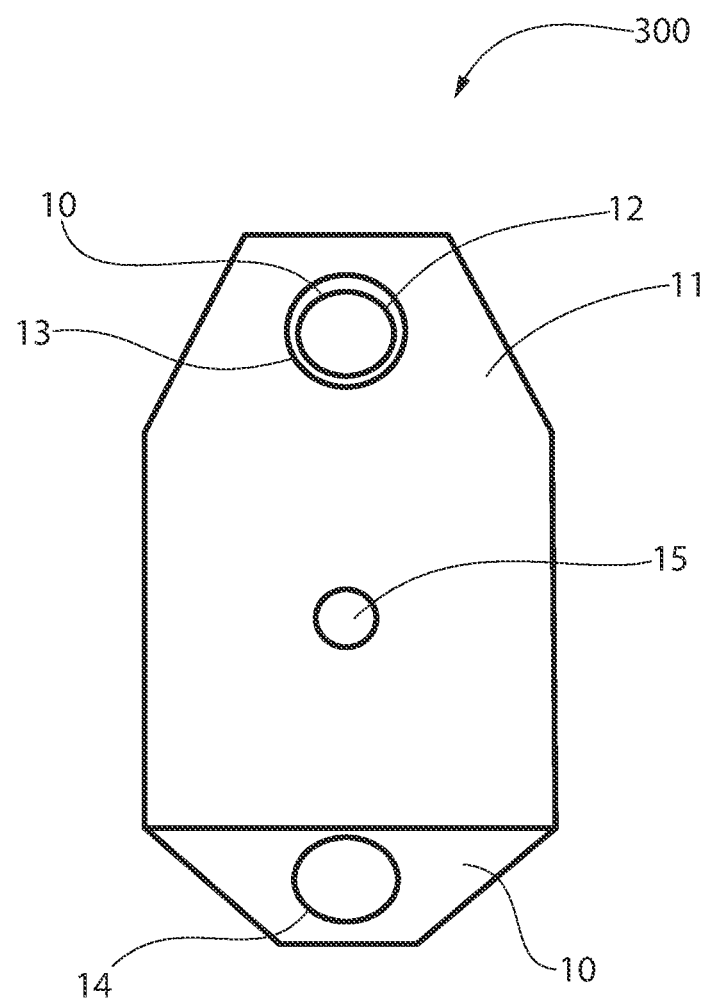
FIG. 3 is a front view of a pulley block in accordance with one embodiment of the present invention.

The features and advantages of the present invention will be apparent to those skilled in the art from a consideration of the following detailed description taken in combination with the accompanying drawings. Referring to the drawings in detail, wherein like reference numerals indicate like elements throughout, there is shown in FIGS. 3-5 a pulley block, generally designated 300, in accordance with one embodiment of the present invention.

In one embodiment, the pulley block 300 includes a first plate 10, a second plate 11, and an axle 15 coupling the first plate 10 to the second plate 11. In one embodiment, the axle is fixed to the first plate 10 via a connecting element (e.g. screw, adhesive, welding, etc.). In one embodiment, the axle 15 is rotationally fixed relative to the first plate 10 but is axially translatable relative to the first plate 10 such that different size sheaves can be selected for use with the pulley block 300. The axle 15 may be a rod, shoulder screw, screw, etc. provided that the sheave can rotate about the axle 15 during use of the pulley block 300. In one embodiment, the second plate 11 is fixed to the axle 15. In another embodiment, the second plate 11 is rotatably coupled to the axle 15 such that the second plate can rotate relative to one or both of the axle 15 and the first plate 10.

Figure 8:
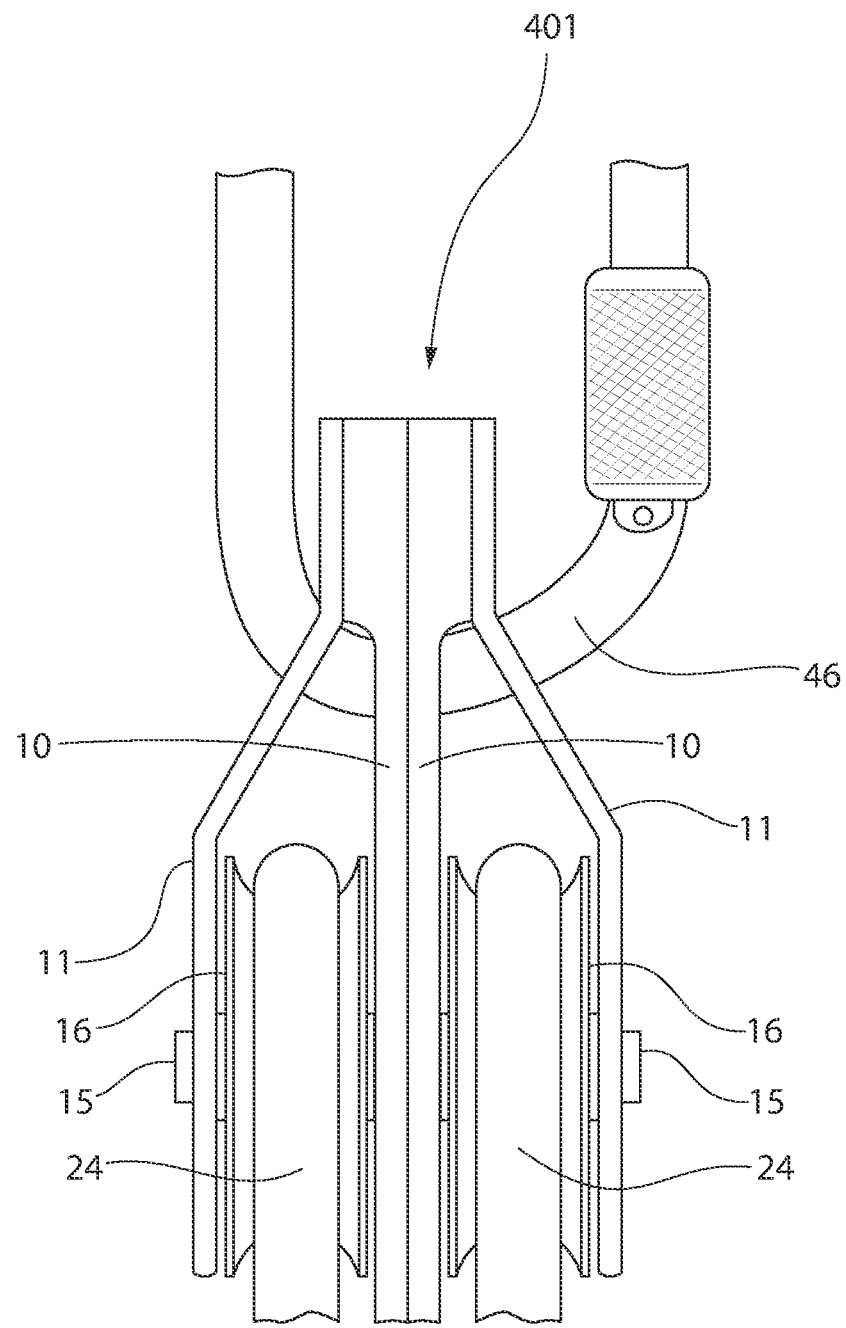
FIG. 8 is a close-up side view of pulley blocks coupled to a carabiner in accordance with one embodiment of the present invention.
Figure 9:
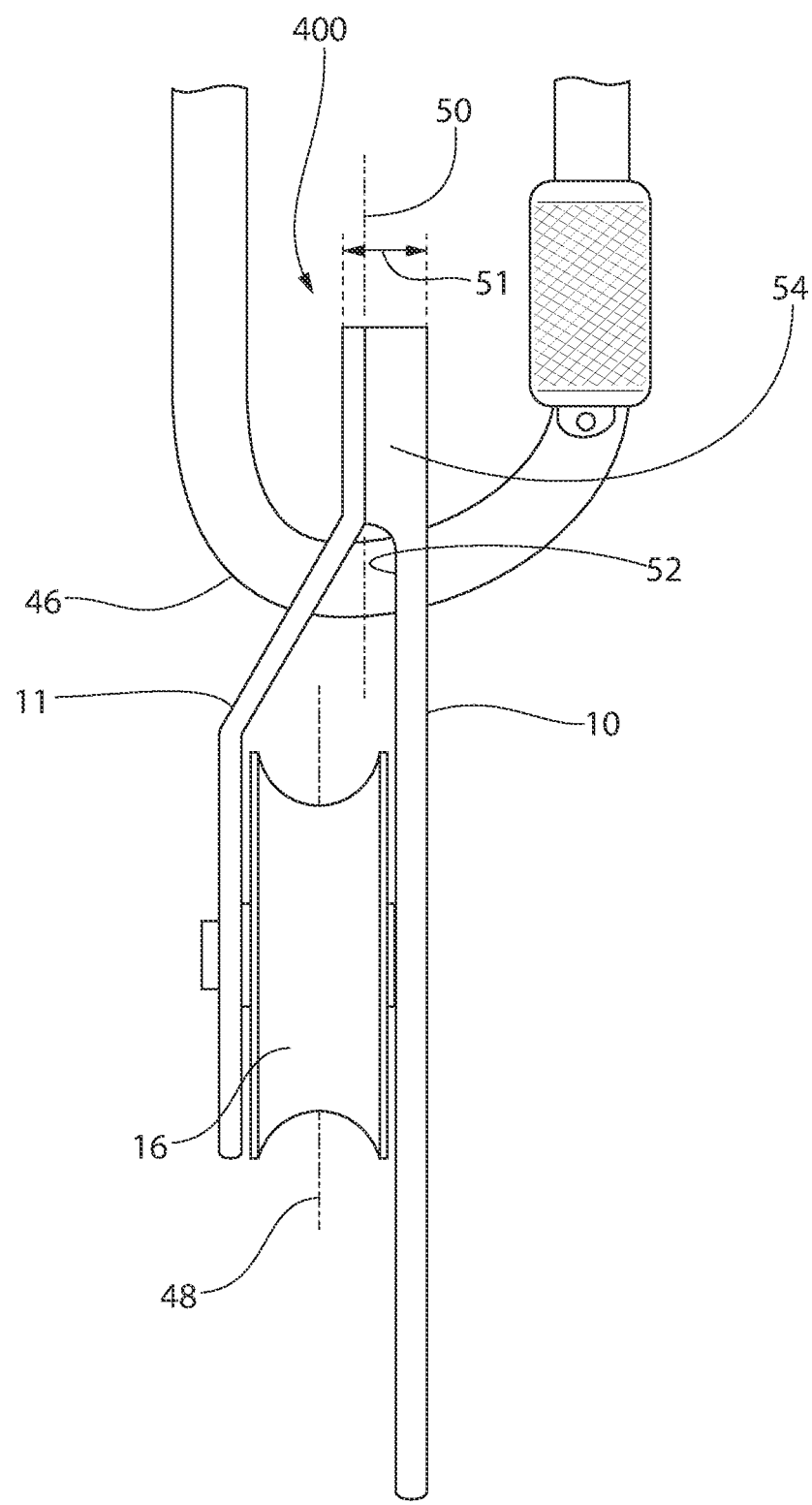
FIG. 9 is a side view of the single pulley block of FIG. 3 coupled to a carabiner.
Figure 10:
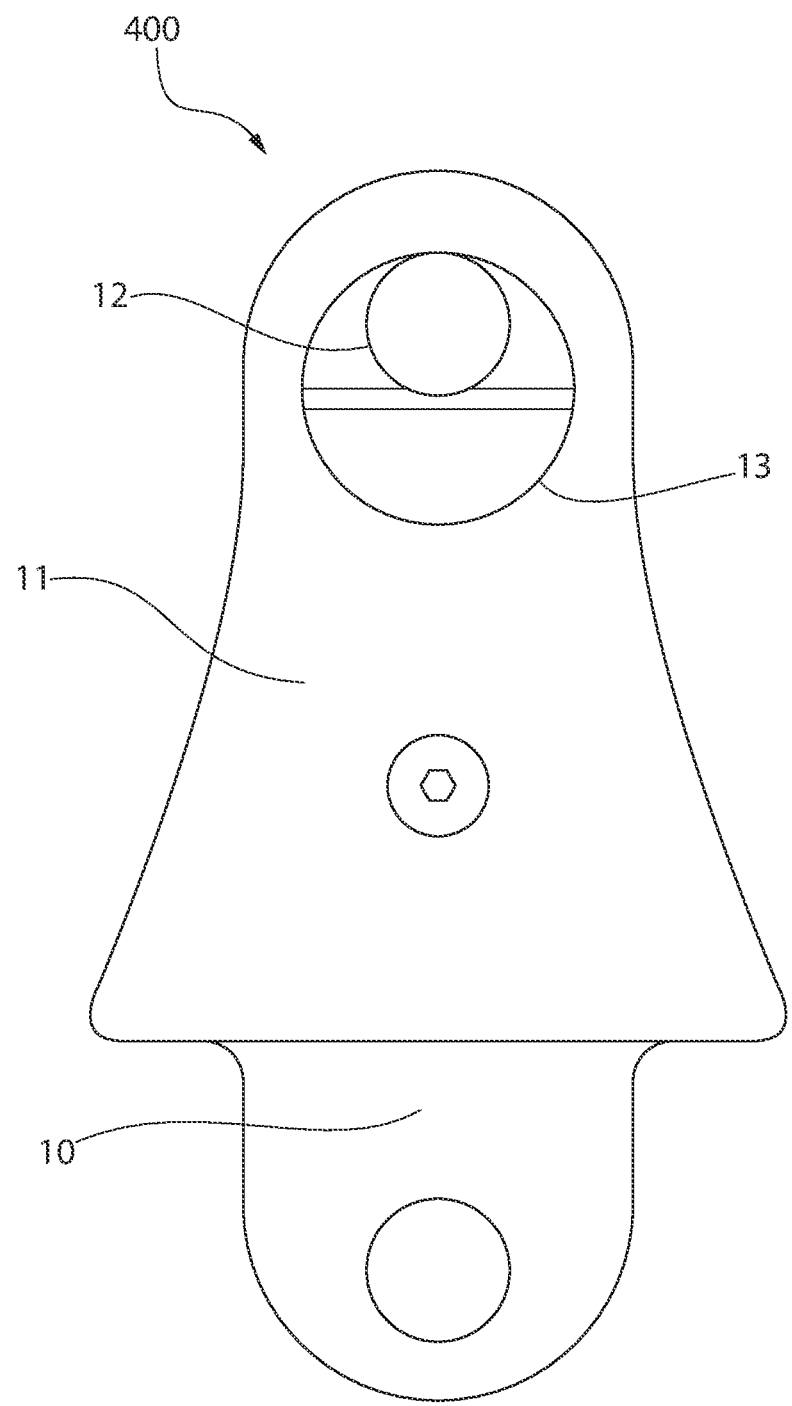
FIG. 10 is a front view of a pulley block in a closed configuration in accordance with one embodiment of the present invention.
Figure 11:
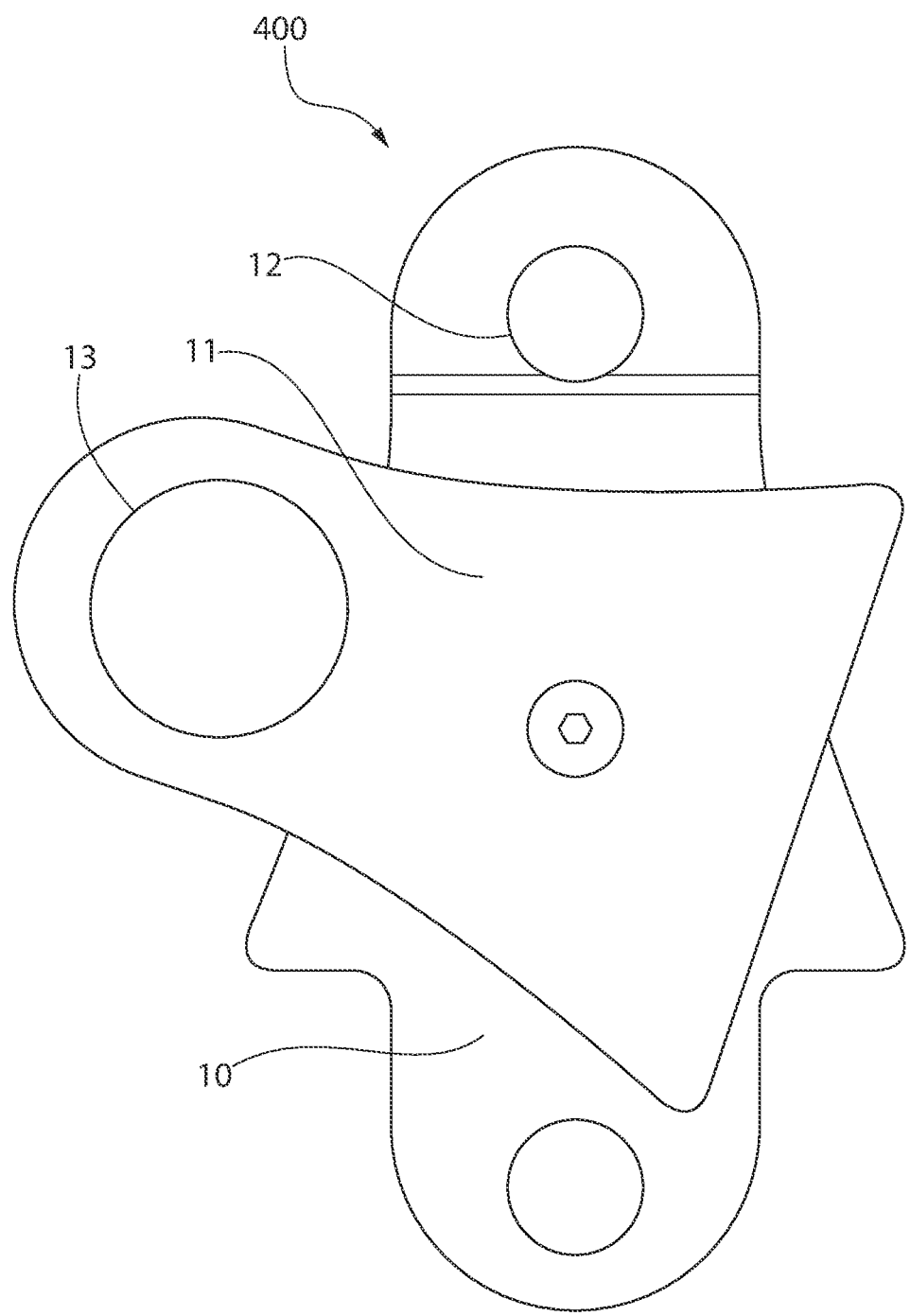
FIG. 11 is a front view of the pulley block of FIG. 10 in an open configuration.
Figure 12:
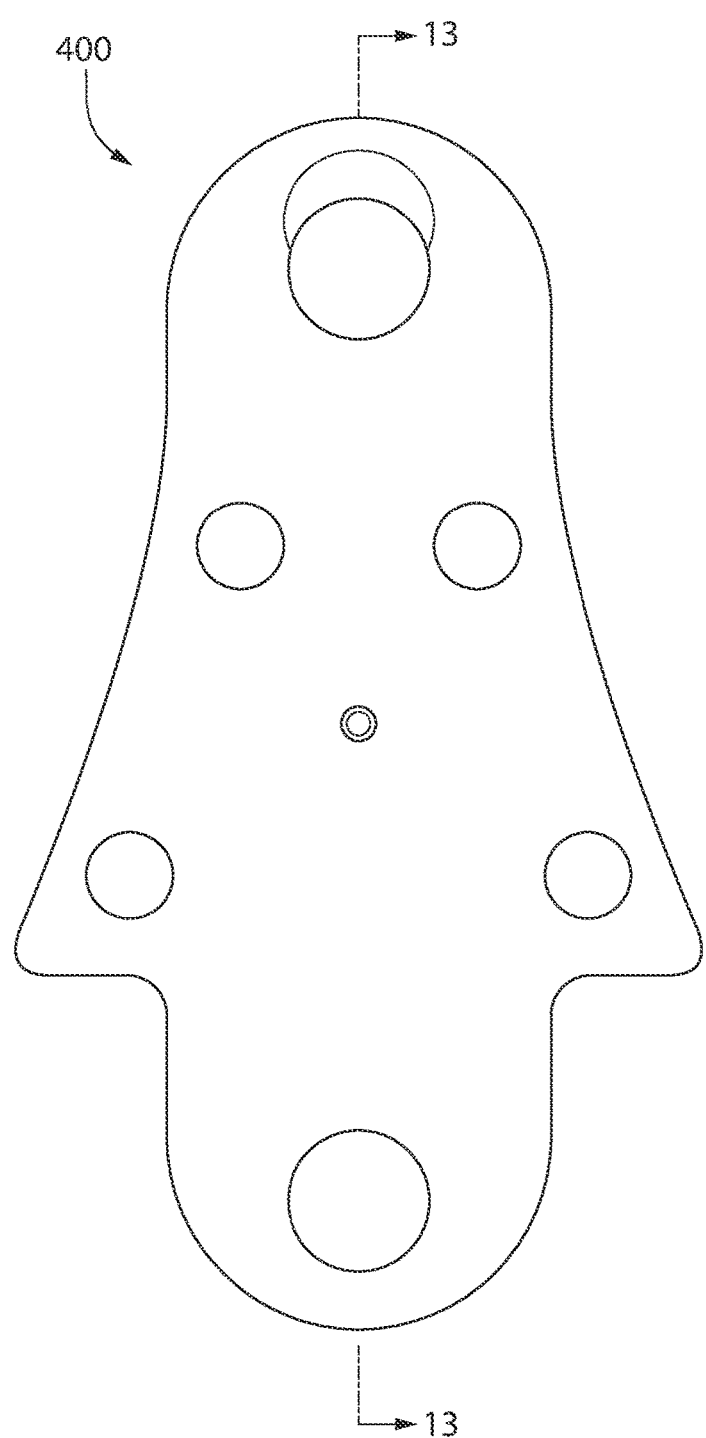
FIG. 12 is a rear view of the pulley block of FIG. 10.

In one embodiment, the second plate 11 pivots around the axle 15 in relation to the first plate 10 to move the pulley block 300 between a closed configuration (FIGS. 4 and 10) and an open configuration (FIG. 11). In one embodiment, the first plate 10 includes an eyelet 12 and the second plate 11 includes an eyelet 13. In one embodiment, the eyelet 12 and eyelet 13 are circular and have the same radii. In one embodiment, eyelet 12 is larger than eyelet 13. In one embodiment, eyelet 12 is smaller than eyelet 13. In one embodiment, eyelet 12 and eyelet 13 are coaxial. In one embodiment, eyelet 12 and eyelet 13 are not coaxial but at least a portion of their respective perimeters are coplanar. In one embodiment, the eyelet 12 of the first plate 10 and the eyelet 13 of the second plate 11 align when the pulley block 300 is in the closed configuration. The eyelets 12, 13 may be configured to receive a coupler 46 (e.g., a carabiner, nut and bolt) to secure the pulley block 300 in the closed configuration and prevent the second plate 11 from pivoting in relation to first plate 10 (as shown in the embodiment of FIGS. 8-9). The coupler 46 may also connect the pulley block 300 to an anchor point, other rigging, etc. In one embodiment, one of the first plate 10 and the second plate 11 include a becket 14 to accommodate additional rigging options. In one embodiment, the eyelets 12, 13 each include a beveled edge.

Figure 4:
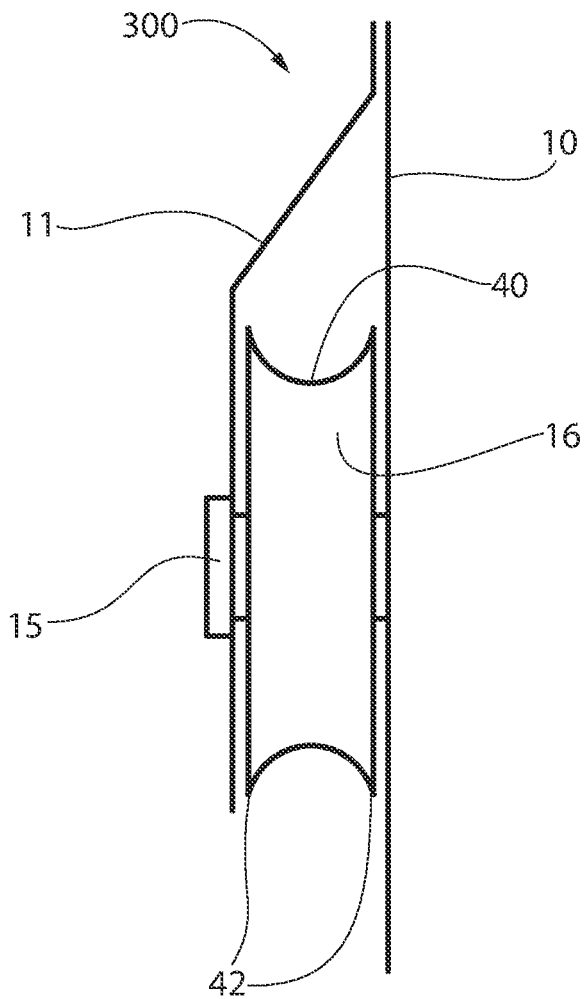
FIG. 4 is a side view of the pulley block of FIG. 3.
Figure 5:
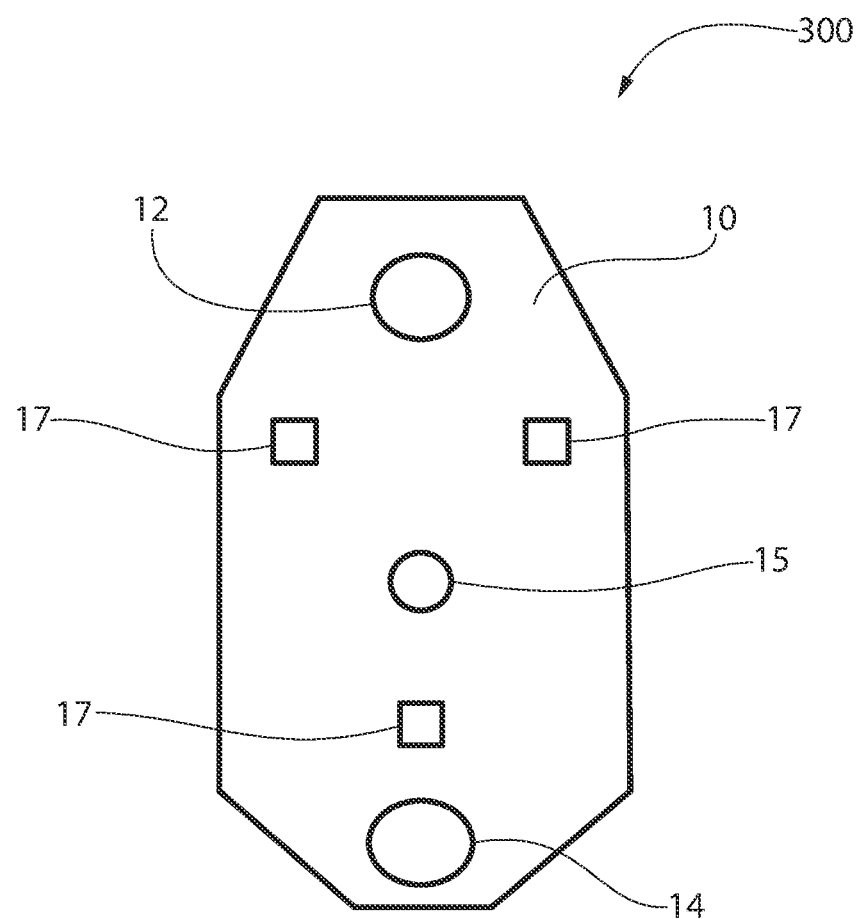
FIG. 5 is a rear view of the pulley block of FIG. 3.

Turning now to FIG. 4, some embodiments of the pulley block 300 include a sheave 16 rotatably coupled to the axle 15. In one embodiment, a groove 40 is defined between edges 42 of the sheave 16. The groove 40 may be configured to receive a bight of rope 44, wire, or cable (best seen in FIG. 7). In one embodiment, the sheave 16 can rotate freely about the axle 15, such that the rope 44 can move through the pulley assembly 300. The thickness of the sheave 16 and the groove 40 may be selected to accommodate the thickness of a selected rope 44. In one embodiment, the sheave 16 is configured to rotate about the axle 15 as the rope 44 is pulled. In one embodiment, the sheave is configured to be positioned between the first plate 10 and the second plate 11 and is rotatable about an axis transverse to each of the first plate 10 and the second plate 11. In one embodiment, the pulley block 300 is configured to receive a bight of rope 44 when the pulley block 300 is in the open configuration.

Turning now to FIG. 5, a rear view of the pulley block 300 is shown. In some embodiments, the first plate 10 includes a connector to secure two pulley blocks to each other, as explained in greater detail below. In one embodiment, the connector 17 includes one or more magnets. In one embodiment, the connector includes one or more of tongue and groove connectors, expandable anchors and recesses, ball and detents, hook and loop fasteners, snap fits, or nuts and bolts. In some embodiments, the connectors 17 are embedded into the first plate 10. In some embodiments, the connectors 17 sit proud of a surface of the first plate 10. In some embodiments, the connectors 17 are recessed from a surface of the first plate 10. In some embodiments, the connectors 17 are coupled to the first plate 10 by weld, screw, adhesive, etc. In some embodiments, the first plate comprises a magnet and the second plate 11 is attracted to the magnet. In one embodiment, the connectors 17 of the first plate 10 includes a plurality of magnets and some of the magnets have opposing poles exposed (e.g. north pole, south pole). In one embodiment, the magnets all have the same poles exposed. Although the pulley block 300 is shown with three connectors 17, any number of connectors may be selected, as desired (e.g., one, two, three, four, five, or ten).

Figure 6:
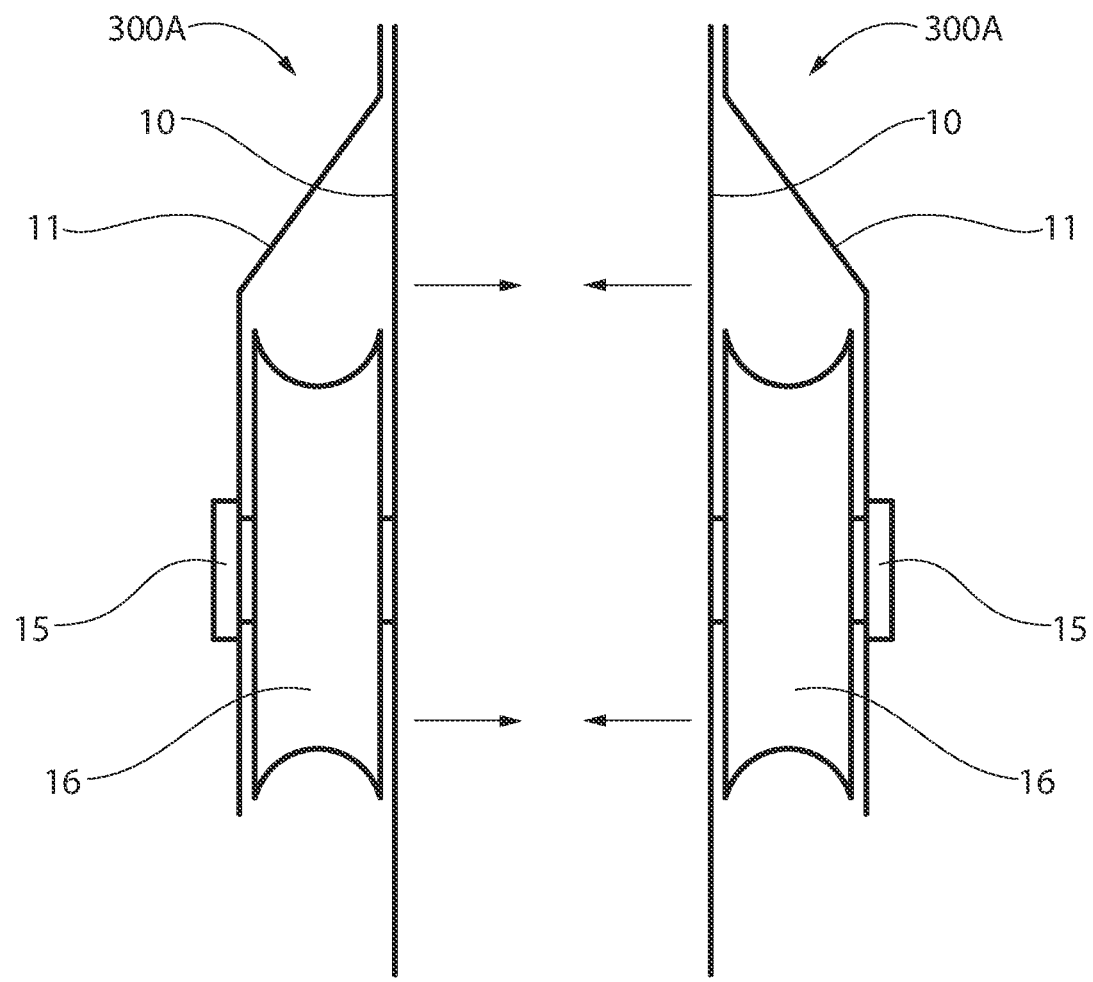
FIG. 6 is a side view of two of the pulley blocks of FIG. 3 in proximity to each other.
Figure 7:
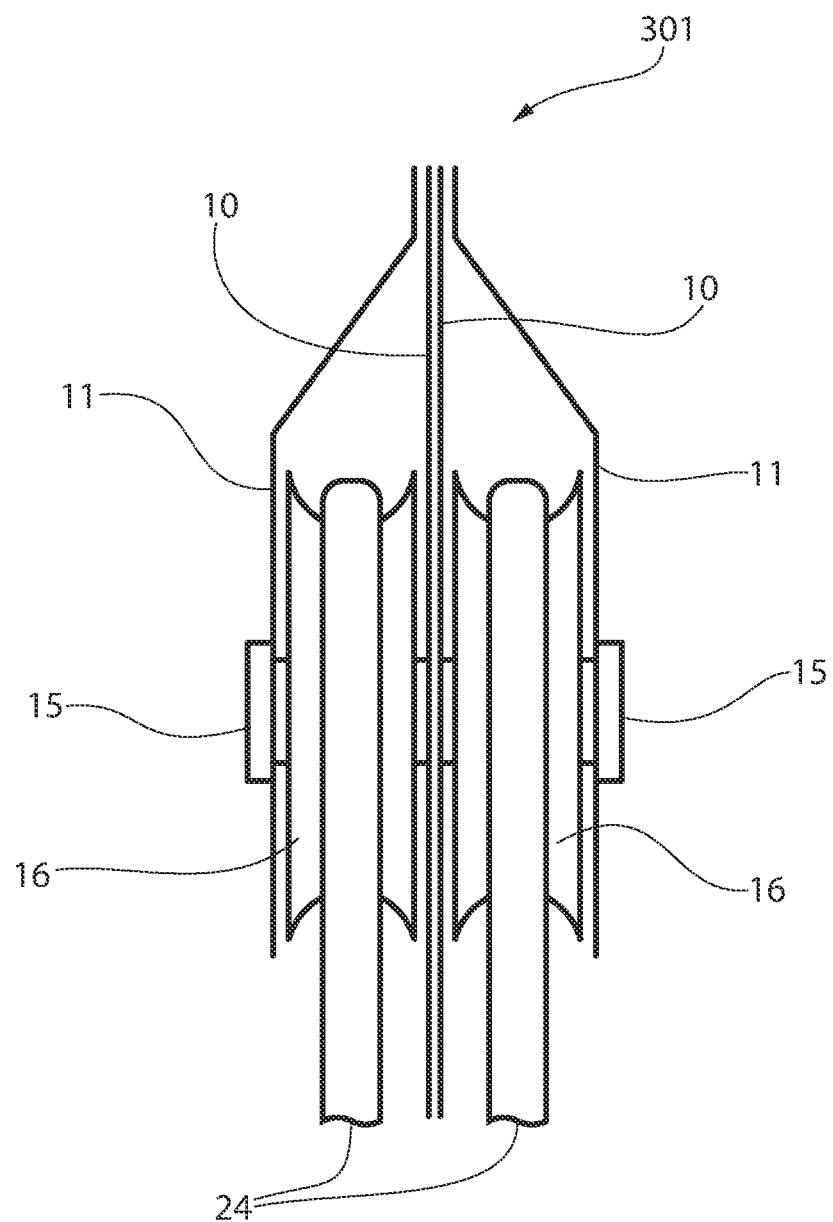
FIG. 7 is a side view the two pulley blocks of FIG. 6 coupled to each other.

FIG. 6 shows a side view of an alpha pulley block 300A and a beta pulley block 300B in proximity to one another. In one embodiment, each of the alpha pulley block 300A and the beta pulley block 300B are substantially similar to each other. In one embodiment, the alpha pulley block 300A and the beta pulley block 300B are substantially similar to pulley block 300. In one embodiment, the alpha pulley block 300A and the beta pulley block 300B each comprise a similar construction including the first plate 10, second plate 11, eyelet 12, eyelet 13, axle 15, sheave 16, and connectors 17. In one embodiment, the alpha pulley block 300A includes an alpha connector and the beta pulley block 300B includes a beta connector. In one embodiment, the alpha pulley block 300A and the beta pulley block 300B are drawn to each other by a magnetic field of the connectors 17 in each of the pulley blocks 300A and 300B. In one embodiment, only one of the alpha pulley block 300A and beta pulley block 300B include a magnet and the other of the alpha pulley block 300A and the beta pulley block 300B comprise a ferrous material which attracts the magnets. In one embodiment, the alpha pulley block 300A and the beta pulley block 300B include a different quantity of connectors 17. In one embodiment, the alpha pulley block 300A and the beta pulley block 300B are aligned with each other by the connectors 17 in each of the pulley blocks 300A and 300B such that the eyelets 12, 13 are aligned when the alpha magnets and beta magnets are brought into proximity with each other. In one embodiment, the connectors 17 in each of the alpha pulley block 300A and the beta pulley block 300B couple the pulley blocks to each other to form a double sheave pulley 301 as shown in FIG. 7. In one embodiment, the coupler 46 (FIG. 8) is coupled to the eyelets 12, 13 of the double sheave pulley 301 to secure the alpha pulley block 300A to the beta pulley block 300B. In one embodiment, the coupler 46 is then coupled to rigging or another structure to support the pulley block 301. In one embodiment, the sheave of the alpha pulley block 300A and the sheave of the beta pulley block 300B are co-axial when the pulley blocks are coupled to each other to form the double sheave pulley block 301. In one embodiment, each of the alpha pulley block and the beta pulley block can be used independently of one another as a single sheave pulley block.

Turning now to FIG. 9, in some embodiments, the sheave 16 is defined by a sheave axis 48. In one embodiment, the first plate 10 confronts the second plate 11 along a plane defined by a plate axis 50. In one embodiment, the plate axis 50 is offset from the sheave axis 48. In one embodiment, the plate axis 50 extends through the center of gravity of the pulley block 400 with the sheave 16 connected thereto. In one embodiment, the plate axis 50 extends through the center of gravity of the pulley block 400 without the sheave 16 connected thereto. In one embodiment, the sheave axis 48 and the plate axis 50 are parallel. In one embodiment, the sheave axis 48 and the plate axis 50 are transverse to each other. In one embodiment, the sheave axis 48 and the plate axis 50 are co-planar. In one embodiment, the first plate 10 includes a shoulder 52 adjacent a head 54. In one embodiment, the head 54 has a greater thickness than an adjacent portion of the first plate 10. In one embodiment, the head 54 is configured to support the pulley block 400 on the coupler 46. In one embodiment, the plate axis 50 extends through a center of gravity of the head 54. In one embodiment, the plate axis 50 extends through a midpoint of the head 54 as measured along axis 51. In one embodiment, the plate axis extends through a midpoint of the pulley block 400.

Figure 13:
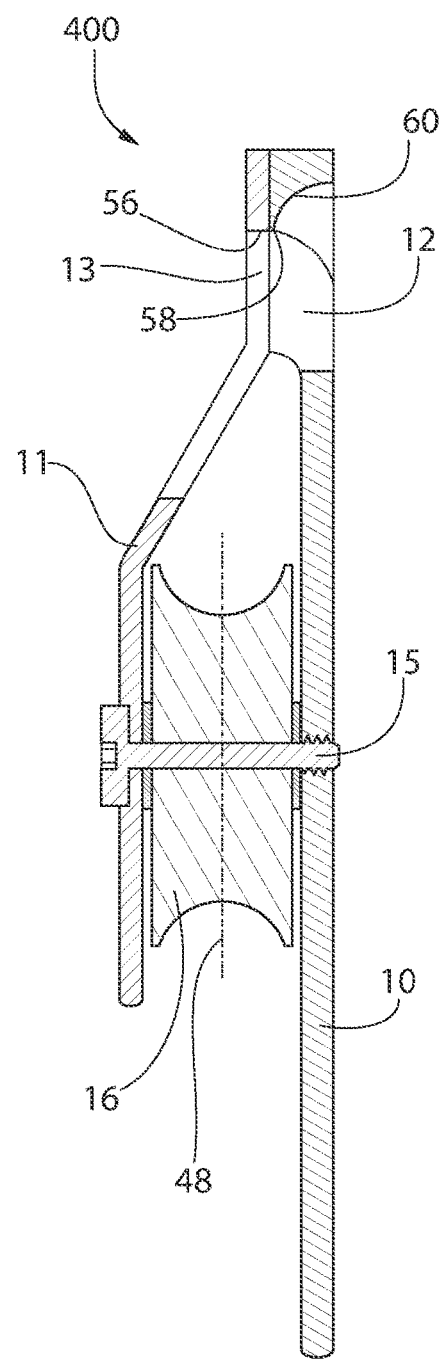
FIG. 13 is a sectional view of the pulley block of FIG. 10 along a plane defined by line 13-13 of FIG. 12.

Referring to FIG. 13, eyelet 12 may include a beveled edge 60. The beveled edge 60 may be configured to reduce the purchase between the coupler 46 and the eyelet 12. In one embodiment, the beveled edge 60 comprises one of a fillet, a chamfer, and a cut out. The eyelet 12 may include a first surface 58 and eyelet 13 may include a second surface 56. The second surface 56 may be thicker than the first surface 58. The first surface 58 of eyelet 12 may have a smaller thickness than an eyelet which does not include the beveled edge 60. The reduced thickness of first surface 58 compared to second surface 56 may position the point of contact (or the midpoint of a surface of contact) between the pulley block 400 and the coupler 46 closer to sheave axis 48.

A point of contact which is closer to the sheave axis 48 may reduce torsional rotation of the pulley block 400 during use thereby reducing friction between the bight of rope and the pulley block 400.

In one embodiment, a kit includes a plurality of pulley blocks 300. In one embodiment, the kit includes a plurality of alpha pulley blocks 300A and a plurality of beta pulley blocks 300B. In one embodiment, each of the pulley blocks 300 in the kit are coupleable with any of the other pulley blocks in the kit. In one embodiment, each of the pulley blocks 300 in the kit are substantially similar to each other. In one embodiment, a method of using the kit includes obtaining a first pulley block 300 from the kit, obtaining a second pulley block 300 from the kit, and engaging the pulley blocks 300 with each other such that the magnets at least partially assist in aligning the blocks and coupling the pulley blocks to each other.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

I claim:

1. A pulley block comprising:
  an alpha pulley block including an alpha pulley block first plate, an alpha pulley block second plate, and an alpha pulley block sheave between the alpha pulley block first plate and the alpha pulley block second plate, and an alpha connector coupled to the alpha pulley block second plate; and
  a beta pulley block including a beta pulley block first plate, a beta pulley block second plate, and a beta pulley block sheave between the beta pulley block first plate and the beta pulley block second plate, wherein the beta pulley block second plate is detachably coupled to the alpha pulley block second plate by the alpha connector,
  wherein the alpha pulley block sheave is defined by a sheave central longitudinal axis,
  wherein the alpha pulley block first plate engages the alpha pulley block second plate along a plate axis, and
  wherein the sheave central longitudinal axis is offset from the plate axis.

2. The pulley block of claim 1, wherein the alpha pulley block and the beta pulley block each include an eyelet configured to receive a coupler.

3. The pulley block of claim 2, further comprising the coupler coupled to the eyelet of each of the beta pulley block and the alpha pulley block.

4. The pulley block of claim 3, wherein the eyelet includes a beveled edge.

5. The pulley block of claim 3, wherein the coupler comprises a carabiner.

6. The pulley block of claim 1, wherein the alpha pulley block second plate is rotatable relative to the alpha pulley block first plate to move the alpha pulley block from a closed configuration to an open configuration.

7. The pulley block of claim 6, wherein the alpha pulley block is configured to receive a bight of rope when the alpha pulley block is in the open configuration.

8. The pulley block of claim 1, wherein the alpha pulley block sheave and the beta pulley block sheave are coaxial when the alpha pulley block is coupled to the beta pulley block.

9. The pulley block of claim 1, wherein the alpha pulley block and the beta pulley block are two of a plurality of pulley blocks included in a pulley block kit, each of the plurality of pulley blocks being coupleable to each of the other of the plurality of pulley blocks.

10. The pulley block of claim 1, wherein each of the alpha pulley block and the beta pulley block are configured for use as a single pulley block.

11. The pulley block of claim 1, wherein the alpha connector comprises a magnet.

12. The pulley block of claim 11, wherein the beta pulley block second plate includes a beta connector comprising a magnet, the beta connector coupled to at least one of the alpha pulley block second plate and the alpha connector.

13. A method of coupling a plurality of sheave blocks together comprising:
  obtaining an alpha pulley block including an alpha connector comprising a magnet;
  obtaining a beta pulley block; and
  coupling the alpha pulley block to the beta pulley block.

14. The method of claim 13, wherein the alpha pulley block comprises a first plate, a second plate, and a sheave between the first plate and the second plate, the sheave being rotatable about an axis transverse to each of the first plate and the second plate.

15. The method of claim 14, further comprising rotating the second plate relative to the first plate to move the alpha pulley block from a closed configuration to an open configuration.

16. The method of claim 15, further comprising:
  coupling a rope to the alpha pulley block when the alpha pulley block is in the open configuration; and
  rotating the second plate relative to the first plate to move the alpha pulley block from the open configuration to the closed configuration.

17. The method of claim 13, wherein the coupling step includes positioning the alpha pulley block near the beta pulley block such that the alpha connector aligns the alpha pulley block with the beta pulley block and couples the alpha pulley block to the beta pulley block.

18. The method of claim 13, further comprising coupling a rope to the sheave of each of the alpha pulley block and the beta pulley block.

19. A pulley block comprising:
an alpha pulley block including an alpha connector comprising a magnet; and
a beta pulley block detachably coupled to the alpha pulley block by the alpha connector.

20. A pulley block comprising:
an alpha pulley block including an alpha pulley block first plate, an alpha pulley block second plate, and an alpha pulley block sheave between the alpha pulley block first plate and the alpha pulley block second plate, and an alpha connector coupled to the alpha pulley block second plate; and
a beta pulley block including a beta pulley block first plate, a beta pulley block second plate, and a beta pulley block sheave between the beta pulley block first plate and the beta pulley block second plate, wherein the beta pulley block second plate is detachably coupled to the alpha pulley block second plate by the alpha connector,
wherein the alpha pulley block and the beta pulley block each include an eyelet configured to receive the coupler,
a coupler coupled to the eyelet of each of the beta pulley block and the alpha pulley block, and
wherein the coupler comprises a carabiner.

21. The pulley block of claim 20, wherein the eyelet includes a beveled edge.

22. The pulley block of claim 20, wherein the alpha pulley block second plate is rotatable relative to the alpha pulley block first plate to move the alpha pulley block from a closed configuration to an open configuration.

23. The pulley block of claim 22, wherein the alpha pulley block is configured to receive a bight of rope when the alpha pulley block is in the open configuration.

24. The pulley block of claim 20, wherein the alpha pulley block sheave and the beta pulley block sheave are coaxial when the alpha pulley block is coupled to the beta pulley block.

25. The pulley block of claim 20, wherein:
the alpha pulley block sheave is defined by a sheave central longitudinal axis,
the alpha pulley block first plate engages the alpha pulley block second plate along a plate axis, and
the sheave central longitudinal axis is offset from the plate axis.

26. The pulley block of claim 20, wherein the alpha pulley block and the beta pulley block are two of a plurality of pulley blocks included in a pulley block kit, each of the plurality of pulley blocks being coupleable to each of the other of the plurality of pulley blocks.

27. The pulley block of claim 20, wherein each of the alpha pulley block and the beta pulley block are configured for use as a single pulley block.

28. The pulley block of claim 20, wherein the alpha connector comprises a magnet.

29. The pulley block of claim 28, wherein the beta pulley block second plate includes a beta connector comprising a magnet, the beta connector coupled to at least one of the alpha pulley block second plate and the alpha connector.

* * * * *